March 5, 1935. W. J. GROHMAN 1,993,139
FASTENER FOR AUTOMOBILE HOODS
Filed July 19, 1933 3 Sheets-Sheet 1
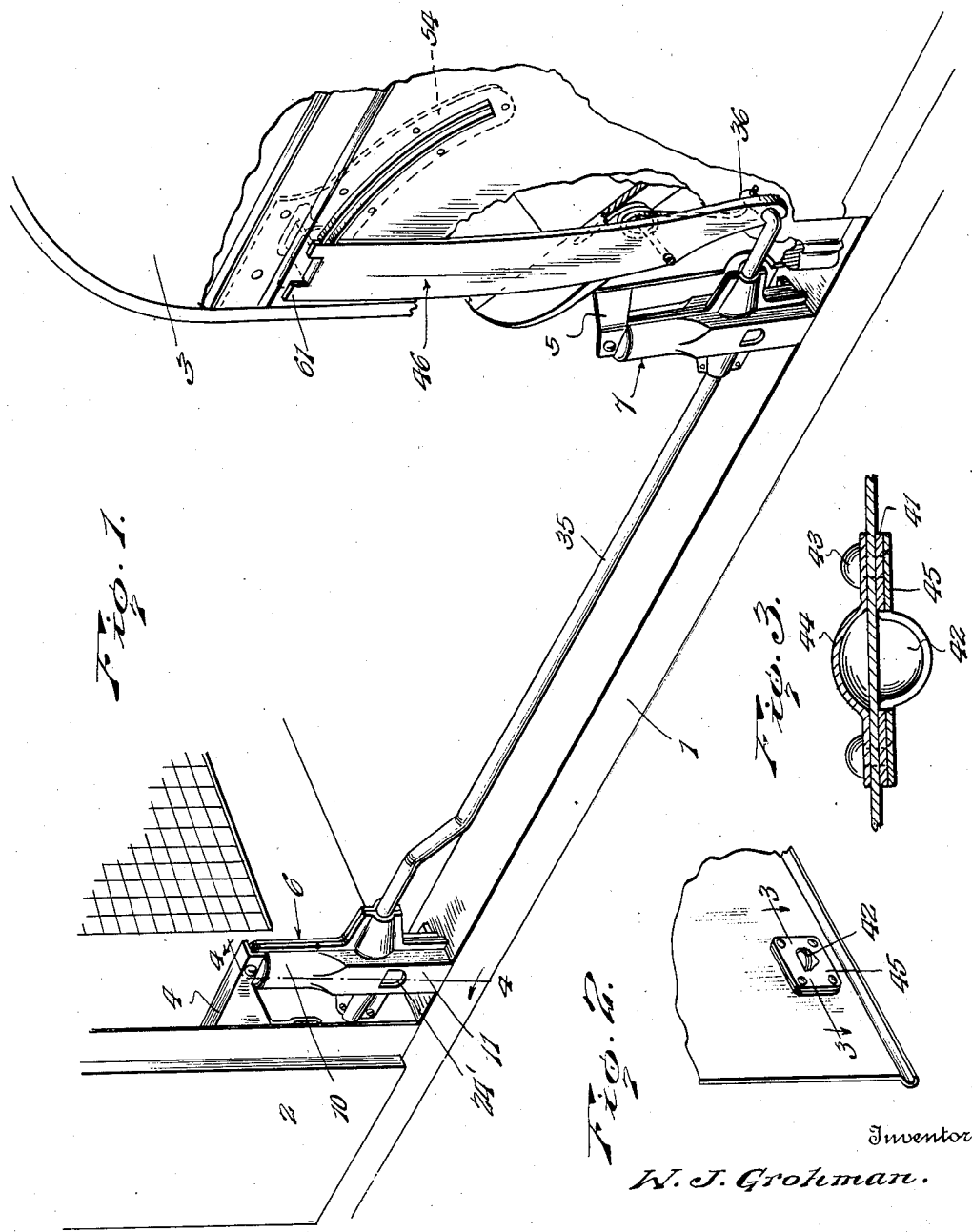
Inventor
W. J. Grohman.
By Lacey & Lacey,
Attorneys

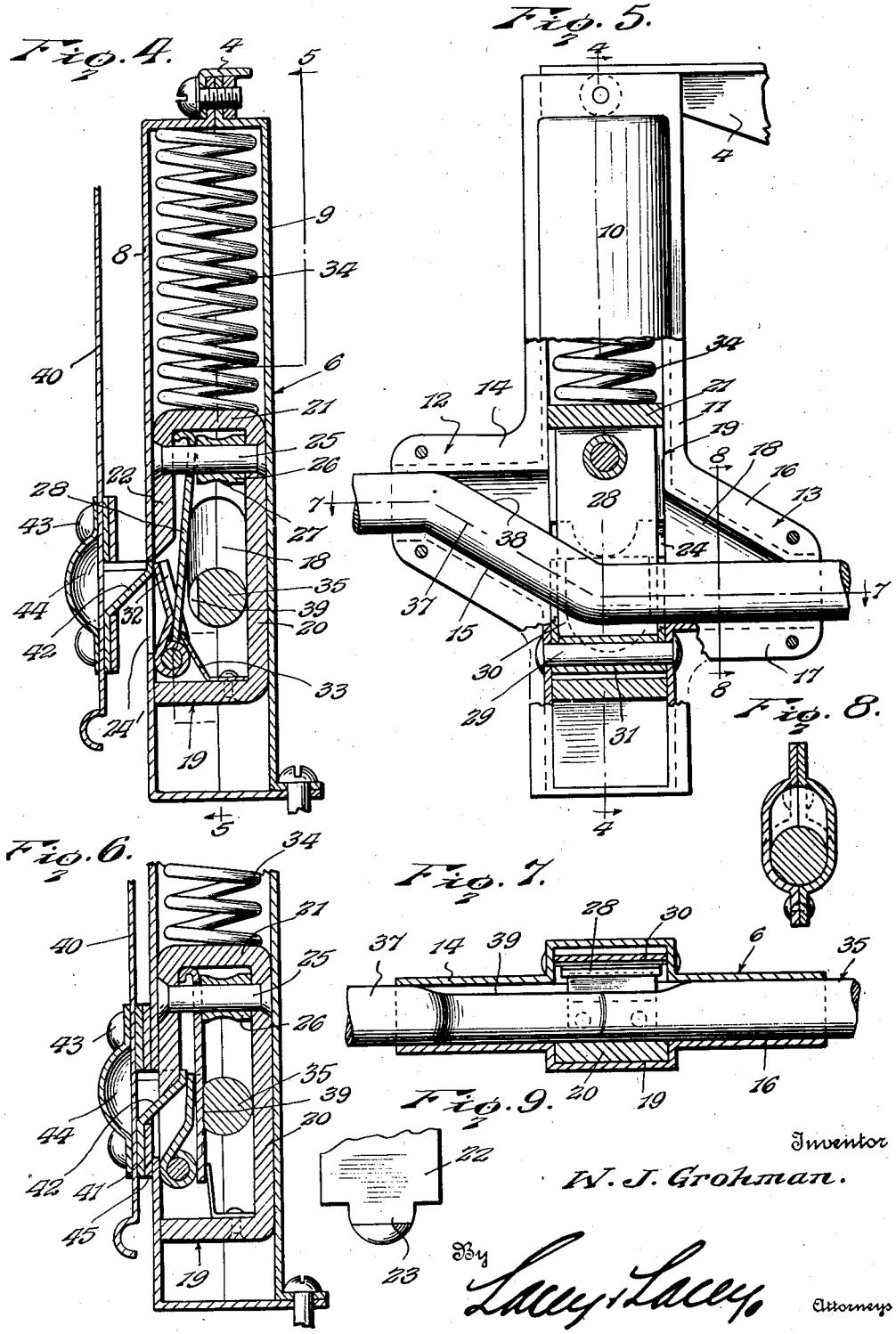

March 5, 1935. W. J. GROHMAN 1,993,139
FASTENER FOR AUTOMOBILE HOODS
Filed July 19, 1933  3 Sheets-Sheet 3
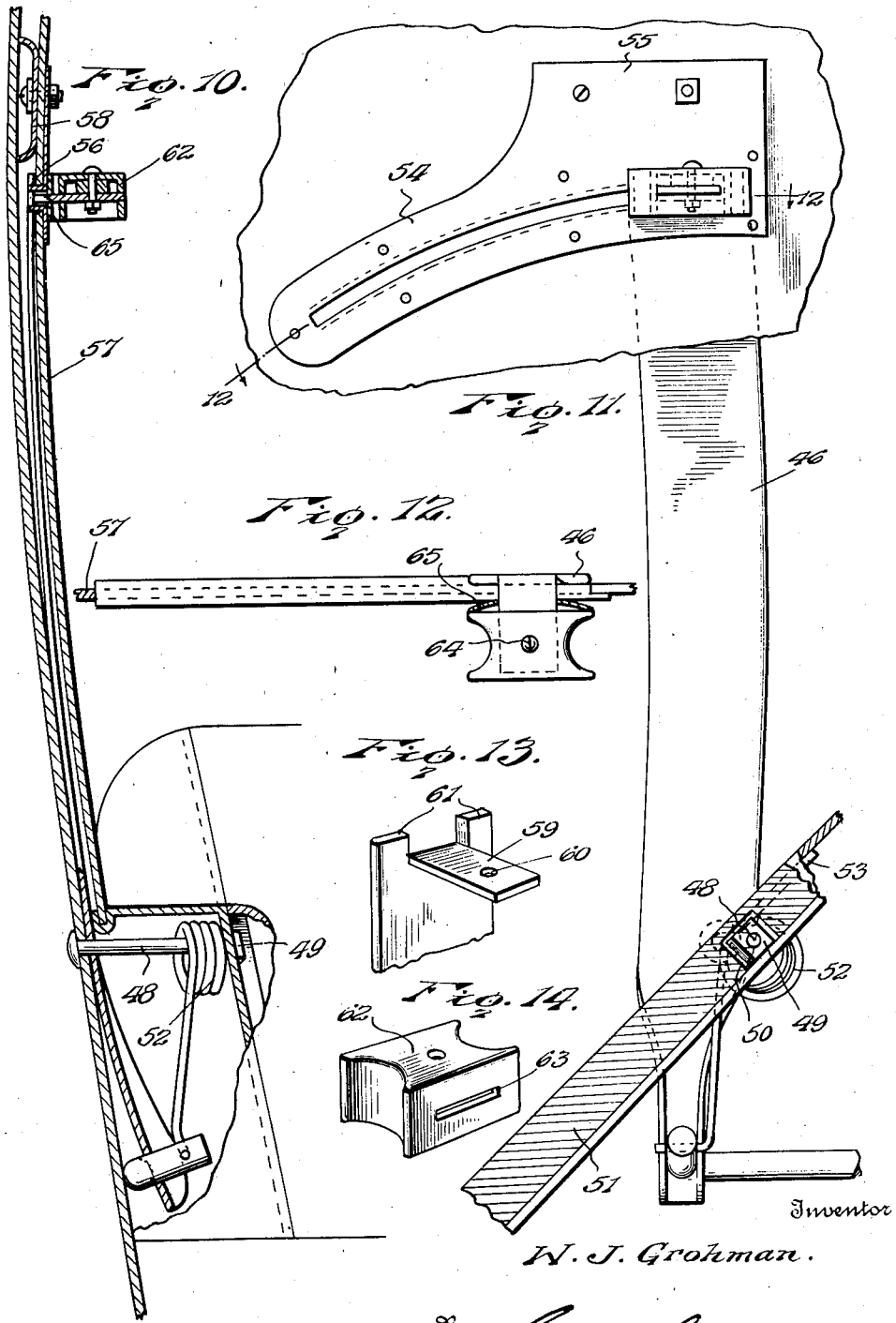

Patented Mar. 5, 1935

1,993,139

UNITED STATES PATENT OFFICE 1,993,139

FASTENER FOR AUTOMOBILE HOODS

William J. Grohman, Denver, Colo.

Application July 19, 1933, Serial No. 681,181

4 Claims. (Cl. 292—335)

This invention relates to an impoved fastener for automobile hoods and seeks, among other objects, to provide a device of this character which will automatically secure the sides of the hood near their lower corners from the interior when the hood is closed tight so that said hood may not be raised from the exterior thereof.

Another object of the invention is to provide a fastener for automobile hoods which will maintain a tension against the sides thereof so that the hood will be tightly secured in position and rattling thereof will be prevented.

A further object of the invention is to provide a fastener for automobile hoods which will maintain the hood in properly alined position relative to the radiator shell and to the body of the car so that danger of sagging of the hood toward one end or the other will be prevented.

A still further object of the invention is to provide a device of this character which is controlled from the interior of the car within easy access of the driver thereof so that the hood may not be released either exteriorly of the car or from beneath the chassis thereof.

And a still further object of the invention is to provide a fastener for automobile hoods which will be of a highly durable construction so that it will be capable of use over long periods of time without the necessity of repairs.

Still further and incidental objects of the invention, not mentioned in the foregoing, will be apparent as the description of the invention proceeds.

In the drawings,

Figure 1 is a fragmentary perspective view of the forward portion of an automobile and showing my improved fastener in position, the hood being removed, Figure 2 is an enlarged fragmentary detail perspective view showing the striker plate and keeper employed, Figure 3 is an enlarged fragmentary transverse sectional view taken on the line 3—3 of Figure 2 and looking in the direction indicated by the arrows, Figure 4 is an enlarged vertical sectional view on the line 4—4 of Figure 1 looking in the direction indicated by the arrows, Figure 5 is an enlarged fragmentary sectional view taken on the line 5—5 of Figure 4, Figure 6 is an enlarged fragmentary vertical sectional view showing one of the latch housings with the latch employed therein in engagement with a keeper which is secured to the striker plate of one of the walls of the hood, Figure 7 is a fragmentary transverse sectional view taken on the line 7—7 of Figure 5, Figure 8 is a fragmentary vertical sectional view on the line 8—8 of Figure 5, Figure 9 is an enlarged detail fragmentary plan view showing the rod-engaging head which is adapted to coact with the actuating rod, Figure 10 is a vertical sectional view showing the mounting of the handle bar employed, Figure 11 is a side elevation of the handle bar, Figure 12 is a sectional view on the line 12—12 of Figure 11, Figure 13 is an enlarged fragmentary perspective view showing an extended end portion of the handle bar, and Figure 14 is an enlarged perspective view showing the grip employed with the handle bar.

Referring now more particularly to the drawings, the numeral 1 indicates a portion of the frame of an automobile and the numeral 2 a portion of the radiator shell thereof. The cowl is indicated at 3. Mounted on the shell 2, slightly above the frame 1 and extending rearwardly toward the cowl, is a bracket 4 which is substantially inverted L-shape in cross section. A bracket 5, which is located in alinement with and in substantially the same horizontal plane with the bracket 4, is secured to the cowl 3.

Mounted on the brackets 4 and 5 and extending between said brackets and the upper surface of the frame 1 are latch casings 6 and 7. Inasmuch as the latch casings are of identical construction, it is believed that the description of a single latch casing will suffice for both. A typical latch casing includes an outer shell which comprises a pair of mating sections 8 and 9 which are preferably pressed from heavy sheet metal. The casing includes a circular reduced upper portion 10 and a squared lower portion 11. The casing also includes lateral integral guide sleeves 12 and 13, the guide sleeve 12 being provided with a straight upper wall 14 and an inclined lower wall 15, while the sleeve 13 includes an inclined upper wall 16 and a straight lower wall 17, the walls of said sleeves defining a guide chamber 18 for the actuating rod, to be described hereinafter.

Slidably mounted within the casing is a locking bolt which is indicated in general by the numeral 19. The locking bolt is formed from a single strip of metal and is bent into shape to include a flat rear wall 20, a flat top wall 21, and a latch portion 22 which extends downwardly in parallel spaced relation to the rear wall 20 and in sliding engagement with the wall 8 of the casing 6. As shown in detail in Figure 9 of the drawings, the latch portion 22 is provided with a depending tongue 23 which is substantially semi-circular in plan.

Extending between the portion 22 and the upper end of the wall 20 is a stud 25 and rotatable on said stud is a roller 26 having an arcuate annular face 27. The roller is of a width substantially three-fourths of the width of the space defined by the inner surface of the latch portion 22 and the wall 20. Pivotally mounted on the stud 25 between the free end of the roller 26 and the inner face of the latch portion 22 is a latch plate 28. The plate 28 extends downwardly within the bolt and terminates a slight distance above the lower end of said bolt. Carried on the lower end 11 of the casing 6 and extending laterally thereof is a pin 29 on which is pivoted a trigger 30 having a loop 31 rotatable on the pin. The trigger is provided at its edges with relatively small upturned flanges 32, and said trigger is adapted to overlie the opening 24' in open position. As seen in Figure 4 of the drawings, the trigger is bent intermediate its ends, thereby, disposing its free end position in offset relation to the portion carrying the loop. Mounted on the bottom of the bolt is a spring 33 which is adapted to engage the lower end of the plate 28 for retaining said plate against the trigger at all times. Carried in the casing, above the bolt, is a coil spring 34 which exerts a downward pressure against the bolt.

Extending through the casings 6 and 7 is an actuating rod which is indicated in general by the numeral 35. The rod is provided at its inner end with an inturned portion 36 and within the casings with offset portions 37 having inclined edges 38. The offset portions extend through the oblong openings 24 of the bolt 19. The inclined edges of the offset portions are adapted to rest in parallel relation with the inclined walls 15 and 16 of the sleeves 12 and 13 so that longitudinal shifting of the rod 35 will shift the offset portions 37 with the inclined edges 38 within the sleeves and casings. By referring to Figure 7 of the drawings, it will be seen that the offset portions within the casings are reduced in thickness to form cut away sections 39 which are adapted to confront the plate 28 in closed position. A portion of the side wall of a hood is shown at 40 and is provided with a keeper plate 41 having a circular keeper 42 thereon. The keeper plate and keeper are retained in position by means of studs 43 extending through an outer plate 44 and an inner reinforcing plate 45. It will be understood that longitudinal shifting movement of the actuating rod 35 will shift the cut away section 39 to confront the plate 28 so that inward movement of the keeper 42 will shift the trigger 30 inwardly and, at the same time, shift the plate 28 inwardly within the cut away section 39 against the tension of the spring 33. The tension of the spring 34 will then force the bolt downwardly and will engage the plate 28 behind the loop 31 of the trigger 30, as shown in Figure 6 of the drawings. The depending lip 23 of the latch portion 22 will be engaged within the keeper 42 and will retain the keeper and hood tightly against the casing so that rattling of the hood or accidental disengagement of said hood from the casing will be prevented.

When it is desired to release the hood so that the same may be raised, for inspection of the engine or the like, the rod 35 is shifted longitudinally in a manner to be described in full hereinafter, and said longitudinal shifting movement of the rod will shift the offset portion so that the inclined edges 38 will engage and ride along the roller and, as the offset portion is shifted longitudinally in the sleeves and casings, the bolt will be shifted upwardly against the tension of the spring 34. As the bolt is shifted upwardly, the latch portion 22, with the tongue 23 thereon, is removed from the keeper 42 and, simultaneously therewith, the plate 28 will clear the loop 31 and, under the tension of the spring 33, will urge the keeper outwardly through the opening 24'. The keeper and hood will then be clear of the casing so that the hood may be raised. Longitudinal movement of the actuating rod in the releasing direction eventually moves the flattened portion 39 thereof to one side of the plate 28 and disposes an uncut portion of the rod back of the plate so that the plate will be held upon the sleeve of the trigger and the plate and trigger maintained in the position shown in Figure 4 and prevented from accidentally moving inwardly. It will be seen therefore that the bolt effectually locks the keeper in position against the casing in such a manner that the hood may not be removed either from the outside or the interior thereof.

The rod 35 is actuated by means of a handle bar which is indicated in general by the numeral 46. The handle bar is formed from a single strip of flat metal and is slightly bowed longitudinally. The bar is reduced at its lower end and is apertured to receive the end 36 of the rod 35. The handle bar 46 is pivoted near its lower end on a stub shaft 48 which extends through the cowl and engages in a nut 49 which is carried in a square notch 50 in the floor-board, the floor-board being shown at 51. Coiled about the stub shaft 48 and having an end passed through the inturned portion 36 is a coil spring 52. The opposite end of the coil spring is disposed beneath the floor-board, as shown at 53. The coil spring normally retains the rod 35 in a forwardly shifted neutral position. The spring will, of course, retain the parts under tension so that rattles will be eliminated, and as the end of the spring passes through the inturned portion 36, said portion will be retained in proper relation to the handle bar. Mounting the handle at its upper end is a mounting plate 54 which is substantially arcuate throughout its length and is provided with a widened portion 55, near one end. The mounting plate is formed with an arcuate slot, and along the upper and lower edges of the slot are provided flanges 56 which extend through an inner wall 57 of the cowl. The handle bar extends between the outer wall of the cowl and the inner wall 57 thereof, said inner and outer walls being held in spaced relation to each other by a spacing member 58 carried by the inner wall above the handle bar. As best seen in Figures 10 and 13 of the drawings, the handle is provided at its upper end with an inwardly directed tongue 59 having an aperture 60 therein, the tongue being bent laterally from the end of the handle and defining spaced end lugs 61 for the handle.

Carried on the tongue 59 is a fingerhold 62 having a slot 63 which is adapted to receive the tongue 59 therethrough. A bolt 64 extends through the hold and through the tongue for firmly anchoring the tongue and hold as a unit. Carried on the tongue 59 and disposed between the inner edge of the hold 62 and the face of the plate 53 is a bowed spring 65 which normally retains the handle under tension so that it will be prevented from slipping to an open position after it has once been closed. The spring, of course, permits the handle bar 46 to shift clear of the notches or recesses formed in end portions of flanges 56 and shown in Figure 12 when the operator applies pressure to the hold 62. The hold 62 is readily accessible to the driver from the interior of the car so that when he desires to shift the rod 35 and release the keeper 42 from the casing, for releasing the hood, it is only necessary that he grasp the fingerhold 62, apply pressure to force the handle bar out of the notches of the flanges 56 and then draw the handle bar rearwardly against the tension of the spring 52. The latch tongues will then be disengaged from the keepers when the handle bar has traveled the full length of the arcuate slot in the mounting plate. After the latch tongues have been disengaged from their respective keepers, the triggers will slightly shift the hood outwardly so that said hood may be raised for permitting access to be gained to the interior thereof. The spring 52 will then return the handle bar to its normal neutral position, with the lugs 61 seated in the cut away portions in the guide plate flanges so that it will be impossible to shift the mechanism in any manner other than shifting the handle bar. When it is desired again to lock the hood in a closed position it is only necessary to apply a slight pressure against the hood sides in a lateral plane. The hood sides will be automatically fastened and locked when the keepers force the trigger inwardly to shift the latch tongues off the rolled ends 31 of the triggers and permit the latch tongues to drop into position behind said keepers. It will be understood that inasmuch as the latch tongues 23 have rounded ends, they will be permitted to seat themselves properly in the keeper so that the hood walls will be drawn into perfect alinement. The hood walls will be firmly maintained in a closed position for the reason that the spring 34 will transmit a downward pressure on the bolt while, at the same time, the rounded substantially conical latch tongues will draw the keeper inwardly against the latch casings 6.

It should be understood that the assembly hereinbefore described is duplicated on either side of the car so that the hood may be locked at either side. It is particularly emphasized that, after the tonneau is locked, it will be impossible for the hood to be raised either from the outside of the car or from therebeneath. The only way to open the hood is to enter the car and grasp the handle for shifting the actuating rod in the manner hereinbefore described.

It is particularly emphasized that the sides of the hood will not be permitted to sag either to the front or to the rear for the reason that said sides are riveted to the strike plates which carry the keepers, which keepers are properly guided into correct position through the openings 24' of the casings 6. It will, therefore, be seen that rattling of the hood will be largely eliminated.

It is believed that the reading of the foregoing description will disclose that I have provided a device of this character which will be characterized by the highest efficiency and utmost utility.

Having thus described my invention, I claim:

1. Means for securing a hood wall of an automobile closed including a casing having a wall formed with an entrance opening for passage of a keeper into the casing, means for mounting said casing in an upright position upon an automobile frame, a bolt slidable vertically within the casing and having a depending tongue to extend partially across the opening and engage a keeper passed inwardly through the opening, a latch plate carried by said bolt to releasably support the bolt raised and out of position to engage a keeper, a trigger carried by the casing and movable by a keeper when the keeper enters the casing to shift the latch plate out of its bolt-supporting position, and a longitudinally movable actuating rod extending transversely through the casing and having a diagonally disposed portion engageable with the bolt for shifting the bolt upwardly to a releasing position when the rod is moved in one direction and also engaging the latch plate when the bolt is in a lowered position to bind the trigger firmly against the keeper whereby the hood wall will be retained in a closed position.

2. Means for securing a hood wall of an automobile closed including a casing formed with an entrance opening for a keeper and adapted to be mounted in a vertical position upon the frame of an automobile, a bolt shiftable vertically in said casing into and out of a lowered keeper engaging position across the opening, a latch plate carried by the bolt, a trigger carried by the casing between the opening and the latch plate, a spring carried by the bolt normally urging the latch plate against the trigger and serving to shift the latch plate into position to engage the trigger and hold the bolt in an elevated position, the trigger when engaged by a keeper entering the opening being shifted inwardly to move the latch plate inwardly and release the bolt, and actuating means having a portion engageable with the bolt for shifting the bolt upwardly and freeing a keeper.

3. Means for securing a hood wall of an automobile closed including a casing adapted to be secured in an upright position upon a frame of an automobile, said casing having sleeves extending from opposite sides thereof provided with straight edges and inclined edges, said sleeves and the portion of the casing between them defining a transverse chamber, a bolt slidable vertically in the casing between the sleeves, the casing being formed with a side opening at the chamber, whereby a keeper carried by a hood wall may pass through the opening into the casing for engagement by the bolt when the hood wall is closed, a vertically disposed latch plate pivoted at its upper end to said bolt, a trigger carried by the casing and engageable by the lower end of the latch plate to releasably support the bolt in a raised keeper-releasing position, a spring carried by said bolt and engageable with the lower end portion of the latch plate for yieldably retaining the latch plate in engagement with the trigger, a spring in the casing above the bolt for urging the bolt downwardly into position across the opening to engage and secure a keeper against withdrawal from the casing, said trigger being movable inwardly by a keeper entering the casing and when so moved adapted to shift the latch plate inwardly to a bolt releasing position, and a longitudinally slidable actuating rod extending through the sleeve and chamber and having an inclined portion engaging the bolt for elevating the bolt to a keeper releasing position when the rod is shifted in one direction out of its normal position.

4. Means for securing a hood wall of an automobile closed including a keeper adapted to be secured to a hood wall and project from the inner face thereof, a casing adapted to be mounted in an upright position upon an automobile frame, a bolt slidable vertically in the casing and having a rear wall, a top and bottom, and a latch portion at its front extending downwardly from the top of the bolt, a pin extending between the rear wall and latch portion of the bolt above the lower end of the latch portion, a roller rotatable on said pin, a latch plate shiftably mounted on the pin and extending vertically of the bolt, a trigger pivoted in the casing between the latch plate and an opening formed in the front of the casing to receive said keeper, a spring mounted on the bottom of the bolt and engaging the latch plate to urge the latch plate toward said trigger for engagement therewith to support the bolt in a raised position, a spring in the casing for urging said bolt downwardly, the keeper upon entering the casing through its opening being adapted to engage the trigger and rock the trigger inwardly to shift the latch plate out of engagement with the trigger and permit downward movement of the bolt and engagement of the latch portion thereof with the keeper plate whereby the hood wall will be secured in a closed position, and an actuating rod shiftable through the casing and engaging said roller for controlling shifting of the bolt vertically into and out of a latching position with respect to the keeper, said actuating rod having an offset portion formed with a cut away section to receive the latch plate when the bolt is in its lowered position.

WILLIAM J. GROHMAN.